UNITED STATES PATENT OFFICE.

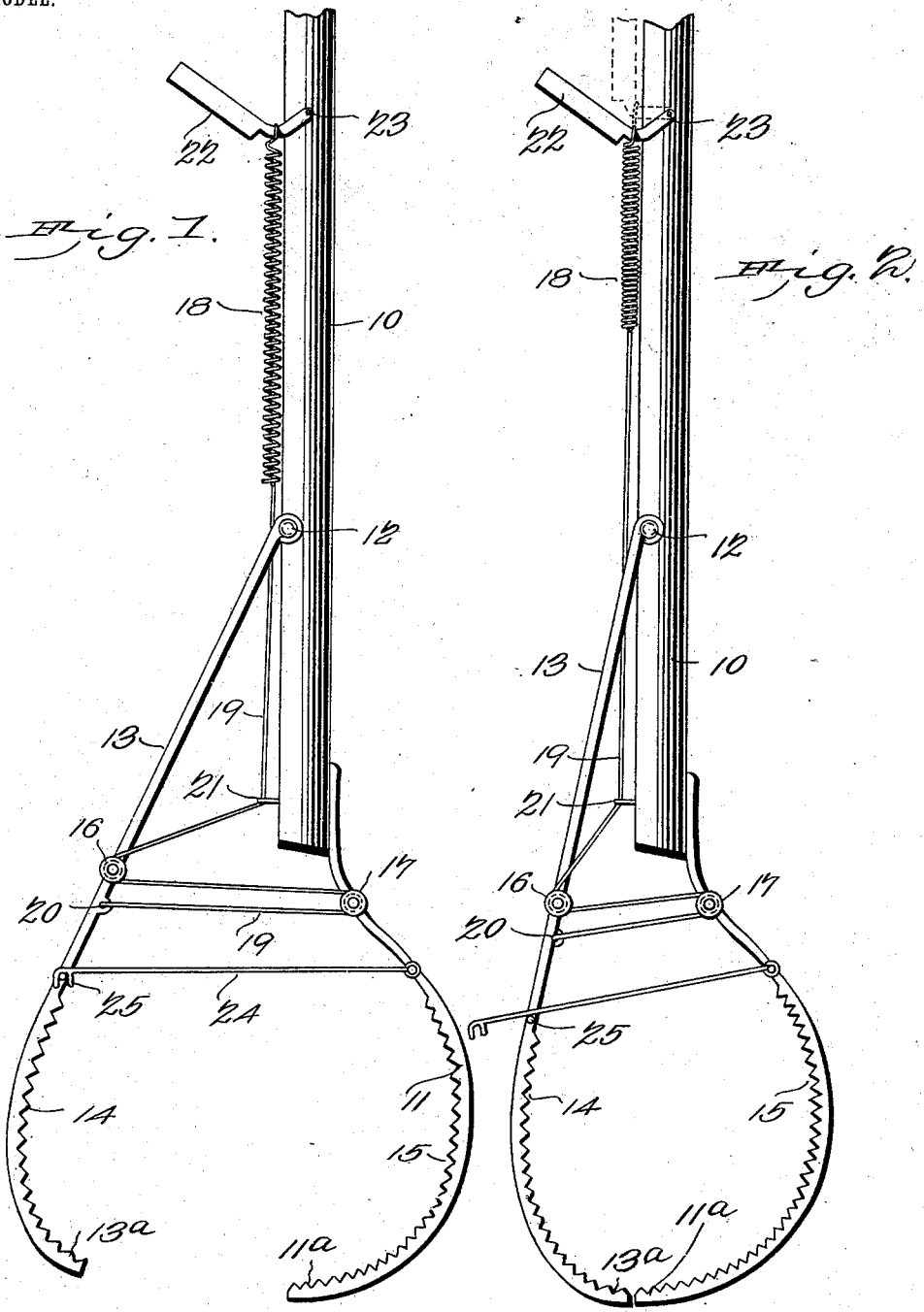

CHARLES AUGUSTUS BINDHAMMER, OF CHICAGO, ILLINOIS.

FISH-GRAPPLE.

SPECIFICATION forming part of Letters Patent No. 718,079, dated January 13, 1903.

Application filed March 22, 1902. Serial No. 99,485. (No model.)

*To all whom it may concern:*

Be it known that I, CHARLES AUGUSTUS BINDHAMMER, a citizen of the United States, residing at Chicago, in the county of Cook and State of Illinois, have invented a new and useful Fish-Grapple, of which the following is a specification.

This invention relates to devices employed for "landing" and otherwise handling fish; and it consists in certain novel features of the construction, as hereinafter shown and described, and specifically pointed out in the claims.

In the drawings illustrative of the invention, Figure 1 is a side view of the device open, and Fig. 2 is a similar view of the device closed.

This implement is designed to be employed in landing fish after they are drawn to the surface of the water, and takes the place of and is intended for the same purpose as the ordinary "landing-net."

The implement consists of a handle member 10, to which a curved arm 11 is attached at one side and projecting beyond one end. Pivotally attached at 12 on the other side of the handle is another arm 13, curved reversely to the arm 11 and conforming thereto, so that when closed, as in Fig. 2, the outer ends 11$^a$ 13$^a$ of the two arms will closely engage. The adjacent faces of the arms 11 and 13 are serrated, as shown at 14 15, to increase their "grip" upon the fish. Attached respectively to the arms 11 and 13 are guide-pulleys 16 and 17, and attached to the handle is a spring 18. A cord 19 is connected at 20 to the arm 13 and passes thence around the pulleys 17 and 16 and beneath guide-loop 21 to the spring 18, to which it is attached, as shown, the force of the spring being thus exerted to maintain the arms 11 and 13, which form the jaws of the implement, normally closed. The outer end of the spring 18 is connected to a lever-arm 22, pivotally supported at 23 upon the handle 10, as shown, so that the tension of the spring may be increased, as hereinafter explained. Pivoted at 23 to the arm 11 is a trigger 24, adapted to engage the arm 13, as by a pin 25, to hold the arm distended. The trigger 24 is so formed as to engage the pin 25 with an easily-detachable connection or "trip" engagement, so that while securely holding the "jaws" distended will be easily disengaged by any pressure applied in the direction of the handle 10. By this arrangement when the jaws 11 and 13 are distended and "set" by the trigger 24, if the implement be forced over the head of the fish, the instant the fish's nose engages the trigger 24 the pressure will release the trigger and permit the spring 18 to forcibly close the jaws and firmly "grapple" the fish and enable it to be safely landed and securely held until the hook is removed. If a stronger grip is required, which may happen when landing large fish, the force of the spring may be materially increased and the grip of the implement correspondingly increased by drawing the lever-arm 22 backward into the position indicated by dotted lines in Fig. 2.

The implement is simple and cheap and at the same time very efficient for the purpose for which it is intended.

The implement can be made in various sizes and styles to adapt them for use on different sizes and qualities of fish and may be made of any suitable material. The proportions may be altered and the device modified in minor particulars without departing from the spirit or scope of the invention or sacrificing any of its advantages.

The guide-pulleys 16 and 17 and the cord 19 are important features of the invention, as they greatly increase the leverage and correspondingly increase the grip of the jaws.

It will be understood, moreover, that the grapple is also designed for engaging any part of the body of a fish by thrusting the implement toward the fish so that the trigger will come in contact with the body.

Having thus described my invention, what I claim is—

1. In a fish-grapple, a handle carrying reversely-curved jaws, means for forcibly closing said jaws together, and a trigger disposed intermediately between the ends of said jaws and their points of attachment for supporting the said jaws distended, and releasable by pressure exerted inward from the inlet to the jaws, substantially as set forth.

2. In a fish-grapple, an operative handle, a curved stationary jaw carried by said handle, a reversely-curved movable jaw carried by said handle, means for forcibly closing said movable jaw, and a trigger member disposed to support said movable jaw open, and adapted to be released by pressure exerted inwardly from the inlet to the jaws, substantially as set forth.

3. In a fish-grapple, a handle, a stationary curved jaw member carried by said handle, a reversely-curved jaw member movably connected to said handle, a spring carried by said handle means connecting said spring and said movable jaw whereby said spring operates to maintain said movable jaw normally closed, and a trigger disposed to hold said movable jaw distended and releasable by pressure exerted inwardly from the inlet to said jaws, substantially as set forth.

4. In a fish-grapple, a handle having a stationary and a movable jaw member, a pulley upon each of said members, a cord attached to one of said jaw members and passing around said pulleys, a spring connecting said cord with a point of attachment and operating to hold the jaws normally closed, and a trigger disposed to support said jaw members open, and releasable by the pressure of the fish when the grapple is operated, substantially as set forth.

5. In a fish-grapple, an operative handle, jaws carried by said handle, a spring adapted to close said jaws, and a lever-arm between said spring and operative handle and adapted to distend said spring to increase its force, substantially as set forth.

In testimony that I claim the foregoing as my own I have hereto affixed my signature in the presence of two witnesses.

CHARLES AUGUSTUS BINDHAMMER.

Witnesses:
   PHILIP VEHON,
   STEPHEN CRANE.